US008819626B2

(12) United States Patent
Hariharan et al.

(10) Patent No.: US 8,819,626 B2
(45) Date of Patent: *Aug. 26, 2014

(54) SHARABLE DEVELOPMENT ENVIRONMENT BOOKMARKS FOR FUNCTIONAL/DATA FLOW

(75) Inventors: Rajaraman Hariharan, Bangalore (IN); Ramakrishnan Kannan, Bangalore (IN); Sandeep Kohli, Bangalore (IN); Priyadarshini Sampath, Bangalore (IN); Karthik Subbian, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/474,477

(22) Filed: May 17, 2012

(65) Prior Publication Data

US 2012/0233594 A1 Sep. 13, 2012

Related U.S. Application Data

(63) Continuation of application No. 12/553,692, filed on Sep. 3, 2009.

(51) Int. Cl.
*G06F 9/44* (2006.01)
(52) U.S. Cl.
USPC ........... 717/120; 717/123; 717/124; 717/129; 717/168; 715/229; 715/230; 707/608; 707/625; 707/661

(58) Field of Classification Search
None
See application file for complete search history.

(56) References Cited

U.S. PATENT DOCUMENTS

| | | | |
|---|---|---|---|
| 5,513,305 A * | 4/1996 | Maghbouleh | 715/234 |
| 6,275,223 B1 | 8/2001 | Hughes | |
| 6,874,140 B1 | 3/2005 | Shupak | |
| 7,392,469 B1 * | 6/2008 | Bailin | 715/230 |
| 7,500,221 B2 * | 3/2009 | Baumann | 717/110 |
| 7,788,238 B2 | 8/2010 | Gabriel et al. | |
| 2003/0056192 A1 | 3/2003 | Burgess | |
| 2003/0080986 A1 * | 5/2003 | Baird | 345/700 |
| 2003/0093780 A1 | 5/2003 | Freudenberger et al. | |
| 2004/0186817 A1 * | 9/2004 | Thames et al. | 707/1 |
| 2005/0144622 A1 | 6/2005 | Ballinger et al. | |
| 2006/0047653 A1 * | 3/2006 | Vaidyanathan et al. | 707/6 |
| 2006/0224967 A1 * | 10/2006 | Marmaros | 715/738 |
| 2006/0282778 A1 | 12/2006 | Barsness et al. | |
| 2007/0005616 A1 * | 1/2007 | Hay et al. | 707/100 |
| 2007/0016552 A1 * | 1/2007 | Suda et al. | 707/1 |
| 2008/0250394 A1 * | 10/2008 | Jones et al. | 717/123 |

(Continued)

OTHER PUBLICATIONS

"Bookmark eBooks/scripts/source code etc." by Rajat. Posted May 15, 2004. AutoHotkey Community Forums. Available: http://www.autohotkey.com/board/topic/229-bookmark-ebooks-scripts-source-code-etc/.*

(Continued)

*Primary Examiner* — Michael Sun
(74) *Attorney, Agent, or Firm* — Ference & Associates LLC

(57) ABSTRACT

An embodiment of the invention provides relative bookmarks that are sharable between developers engaged in product development utilizing integrated design environment applications. The relative bookmarks are sharable in that they can be exported, imported, activated and deactivated. The relative bookmarks are relative in that they do not rely on the original code line and contain at least function and/or data flow information, facilitating quick identification of relevant lines of code that have been previously bookmarked. The relative bookmarks can also be utilized to insert breakpoints.

14 Claims, 5 Drawing Sheets

(56) References Cited

U.S. PATENT DOCUMENTS

2008/0281822 A1* 11/2008 Goradia ........................... 707/7
2009/0249291 A1    10/2009 Bak et al.
2010/0017700 A1     1/2010 Odean et al.
2012/0047451 A1*  2/2012 Marmaros ..................... 715/760

OTHER PUBLICATIONS

"User-defined Bookmarks—Wingware Python IDE". Copyright 1999. Available: http://www.wingware.com/doc/edit/bookmarks.*

Vipul, Patel, "Visual Studio Tip of the Day—Bookmarks" C# VS Deployment and all geek talk. Published Jan. 20, 2006, 2 pages. Available: http://msmvps.com/blogs/vipul/archive/2006/01/20/Visual-Studio-Bookmarks.aspx. (accessed Dec. 10, 2012).

Rader, Devin, "Where Did My Icons Go?" Visual Studio, May 2005. MSDN Library. Copyright 2012. 15 pages. Available: http://msdn.microsoft.com/en-us/library/ms379619(VS.80).aspx. (accessed Dec. 10, 2012).

"How to Bookmark Code." Visual Studio 2005. MSDN Library. Copyright 2012. Available: http://msdn.microsoft.com/en-us/library/xc3ed5eh(d=printer,v=vs.80).aspx. Last accessed Jan. 10, 2014.

* cited by examiner

| Error Log | Tasks | Problems | 🕮 Bookmarks X | | |
|---|---|---|---|---|---|
| 2 items | | | | | |
| Description | | | Resource | Path | Location |
| copyMBeansto ME(targets); | | | ExtDiscoveryProvider.java | com.ibm.usmi.webservices/src/com/ibm/webservices/extdiscovery | line 74 |
| populatingProperties | | | BasicDiscoveryProfileProvider.j | com.ibm.usmi.webservices/src/com/ibm/webservices/discovery/profile | line 120 |

FIG. 1

SHARABLE DEVELOPMENT ENVIRONMENT BOOKMARKS FOR FUNCTIONAL/DATA FLOW

CROSS REFERENCE TO RELATED APPLICATION

The application is a continuation of U.S. patent application Ser. No. 12/553,692, entitled SHARABLE DEVELOPMENT ENVIRONMENT BOOKMARKS FOR FUNCTIONAL/DATA FLOW, filed on Sep. 3, 2009, which is incorporated by reference in its entirety.

BACKGROUND

The field of the invention is generally integrated development environment (IDE) applications. Computer implemented products (e.g. software) are commonly developed in a distributed environment. Often developers will be in geographically distant locations, whereas support engineers, for example, L3 engineers, will often be located in yet another location.

An integrated development environment (IDE) (also referred to as integrated design environment or integrated debugging environment) is an application providing comprehensive facilities to developers for software development. An IDE typically contains one or more of a source code editor, a compiler/interpreter, automation tools, debugger, a version control system and various other tools can be integrated to simplify the construction of the graphical user interface (GUI). Many IDEs also have a class browser, an object inspector, and a class hierarchy diagram for use with object-oriented software development.

Products tend to evolve over time, accumulating various changes. In a software product which has existed for quite sometime (for example around 10 years or more), thousands of lines of code (LOC) are segregated into different components. New features get added to such complex products with each release by different developers/architects around the world. It may be important, for example, for an L3 support engineer located in a distant geographic location to know how the functional flow is implemented for the feature and how the data gets changed at various functions. Also when a new member joins the support team, he or she should be given some sort of a code level component/function flow and data flow lessons.

Typically a developer will, for example, make changes to the product that impact many different LOC. The developer implementing the change(s) needs to communicate to the support engineers and other team members what has been changed, particularly in terms of function calls and returns and how the corresponding data is modified, i.e. function/data flow information. This is currently accomplished in a knowledge transfer session, where a developer will make a separate presentation to the other team members; e.g. using a flow chart such as produced by PowerPoint® or as a text document.

In view of the forgoing, the inventors have recognized a need for improving upon conventional arrangements.

BRIEF SUMMARY

At least one embodiment of the invention broadly contemplates providing sharable, relative bookmarks indicating function/data flow information as a feature in IDE. The relative bookmarks point to or link to a line of source code and include functional/data flow information. Developers can share relative bookmarks in a convenient format (e.g. XML file) which when imported into the IDE will show the function and/or data flow created with the relative bookmark. Whenever there is a change due to an enhancement/feature or defect fix, etc., along with the source changes, the corresponding relative bookmark (e.g. XML file) will also be checked into the source code repository. Thus, the individual (e.g. L3 support engineer) is able to import the relative bookmark into his or her workspace for convenient access to this information. An embodiment of the invention also provides the ability for one working in the IDE to navigate the source code as per the function/data flow defined in the relative bookmark file. Moreover, one has the ability (in the IDE) to choose to navigate the function or the data flow using a control key.

In summary, one aspect of the invention provides a method comprising: utilizing one or more processors of a machine to execute computer readable program code configured to provide one or more relative bookmarks for one or more lines of code; and utilizing the one or more processors of the machine to execute computer readable program code configured to export the one or more relative bookmarks to one or more repositories.

For a better understanding of the aspects of the invention disclosed herein, together with other and further features and advantages thereof, reference is made to the following description, taken in conjunction with the accompanying drawings, and the scope of the invention will be pointed out in the appended claims.

BRIEF DESCRIPTION OF THE SEVERAL VIEWS OF THE DRAWINGS

FIG. 1 illustrates a bookmark of an IDE application.

DETAILED DESCRIPTION

Figure 2:
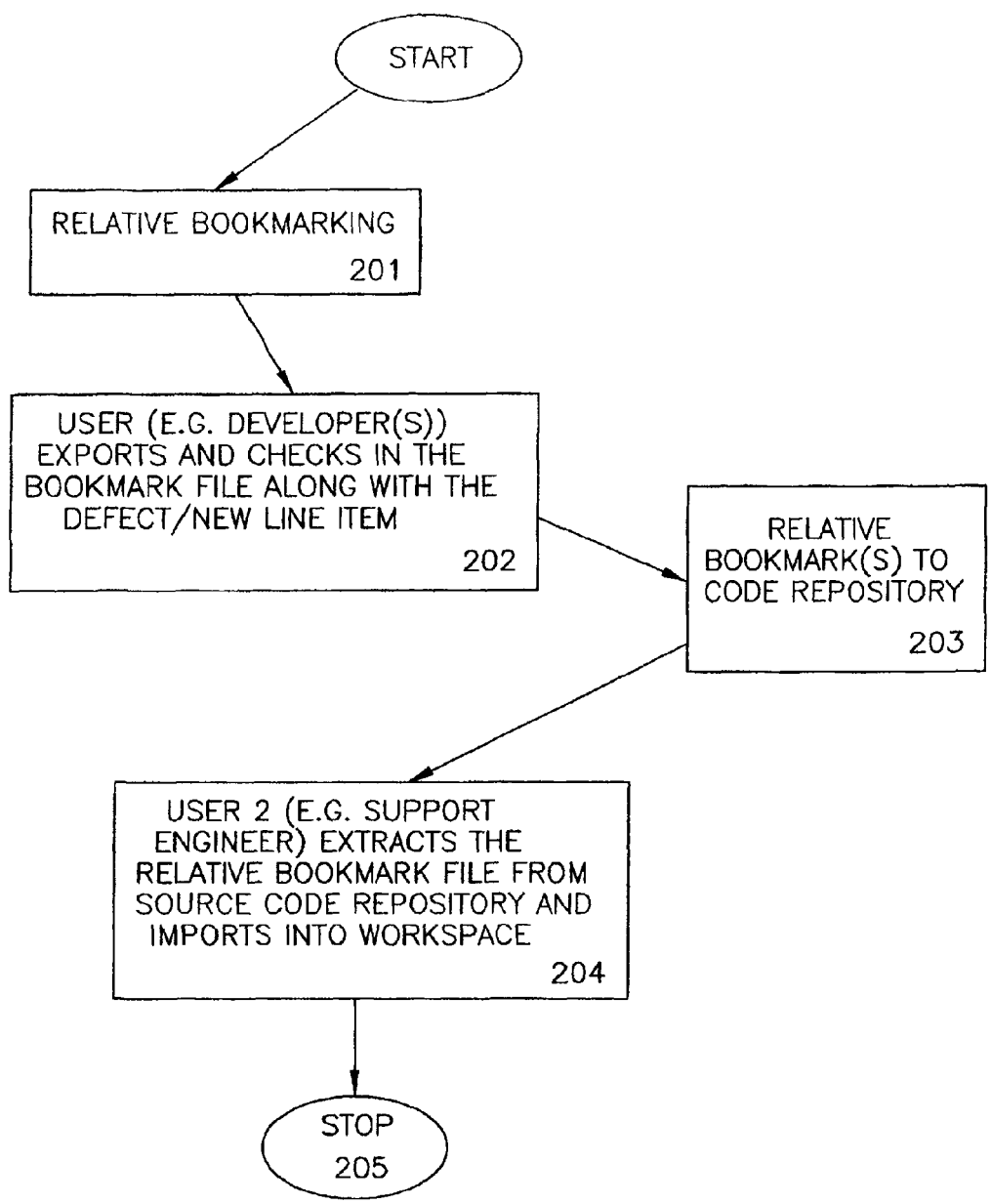
FIG. 2 illustrates a method of exporting/importing relative bookmarks according to one embodiment of the invention.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the embodiments of the invention.

The illustrated embodiments of the invention will be best understood by reference to the drawings. The following description is intended only by way of example and simply illustrates certain selected presently preferred embodiments of the invention as claimed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As above, the inventors have recognized that it has become a difficult task to understand computer-implemented product developments in terms of functional flow and data flow. As a non-limiting example, a developer located in one location will often have to change a product and then inform others, for example support engineers, at different locations what the change is and how it effects the source code. For example, when a function sequence is changed the functional flow is changed. The corresponding data passed is also modified, changing the data flow. Thus, in a globally distributed development/support environment, it becomes a critical challenge for effective skill transfer by developers, for example in the U.S., in development stage to L3 support engineers in maintenance stage. In products for which there may be a large amount, for example over 100,000 of LOC segregated by numerous components, tracking and understanding changes is a difficult task. It is necessary for the L3 support engineers to understand the functional/data flows of the implemented features for better turn around time to fix support defects. Currently there are code level designs (CLD) which give the code level details that gets captured in a flat file, presentation, document in a database, etc. Under these scenarios, there is no way now to automatically map this to the source files while working in the IDE. Thus subsequent developers are left with conventional knowledge transfer documents (e.g. external PowerPoint® slides) of minimal use.

As shown in FIG. 1, bookmarks are available in IDEs to remember a source code line. Bookmarks currently supported provide Description 101 (name, e.g. copyMebeanstoME(targets)), 102 Resource (file, e.g. ExtDiscoveryProvider.java)), Path 103 (e.g. com.ibm.usmi.webservices/src/com/ibm/usmi/webservices/extdiscovery), and Location 104 (e.g. line 74). This information can be bookmarked by an individual developer in an individual (machine specific) IDE. However, the inventors have recognized at least one problem with current bookmarks is that there is currently no way of sharing the information contained in these bookmarks between developers and IDEs.

The inventors have also recognized that HLD/LLD/CLD (high level design, low level design, and code level design), which give only high level details of the product/code, are unsatisfactory and that there is currently no mechanism(s) to capture the code/data flow in an adequate way to support effective knowledge transfer. In current approaches where the function and data flow are given in a flat text file, the support engineer needs to map the information in the flat text file to the source code in the IDE. In other words, the information is not linked to the source code.

For example, in the flat text file:

```
initialisePS(int);
    checkparam(int, float);
    allocatebuffer(int);
``` the function represented by intialisePS(int) is calling two functions represented by checkparam(int, float) and allocatebuffer(int). The two called functions may be in the same file as the function represented by intialisePS(int) or in different files, i.e. the two called functions may be anywhere in the source code. Currently, the developer will indicate this information in a flat text file or in a PowerPoint® file, whereas the support engineer will be looking at the source code in his or her IDE (e.g. Microsoft® Visual Studio® or Eclipse IDEs).

The inventors have recognized that confusion is likely to increase if the developers do not document the flow information properly. For example, assuming a developer documents only the function name for defining a function flow, if it is a C++ code, function overloading is a very common scenario. Thus, support engineers will likely be confused as to which of the overloaded functions the developer is referring to in the document.

Moreover, the inventors have recognized that often the text flow document is not kept in sync with the changing code, hence it becomes difficult to map the text file to the code. The inventors have also recognized that such a flat text file is not mandatory and moreover code optimization and intelligent coding practices (e.g. Macros, templates, recursions and other intelligent loops) are commonly used by developers during coding (e.g. to save time and make code work efficiently) but are mostly left unexplained in any document.

Accordingly, the inventors have recognized a need for sharing bookmarks containing functional/data flow information between developers and between IDEs. Thus, at least one exemplary embodiment of the invention provides sharable, relative bookmarks for functional and data flow information transfer as a feature in IDE to point to a line of source code. The bookmarks are sharable in as much as they are importable/exportable between IDEs. Developers can share these relative bookmarks in a convenient format (e.g. XML file) which when exported by one developer (e.g. in US), and imported by another developer (e.g. remote L3 support engineer) into his or her IDE, will show the function and/or data flow, i.e. as bookmarked by the first developer (in the US).

Turning to FIG. 2, a high level view of the overall relative bookmark sharing method is shown according to one embodiment of the invention. As illustrated, a first user (e.g. a developer) first starts (201) by making changes to the product and saving those changes as relative bookmarks (further described herein). Assuming there are at least some changes that deal with data/function flow, the first user creates relative bookmarks to indicate this. At 202, the first user exports and checks in the relative bookmark file along with the changed line item. The relative bookmarks are stored in the file repository at 203. Once stored in the repository at 203, a subsequent user has the relative bookmarks available. For example, a support engineer can extract the relative bookmark file from the source code repository and import it into his or her workspace, thus providing important information regarding data/function flows as per the relative bookmark(s).

Thus, whenever there is a change due to an enhancement/feature or defect fix, etc., along with the source changes, the corresponding relative bookmark (e.g. XML file) will also be checked into the source code repository. The next individual (e.g. L3 support engineer) is later able to import the relative bookmark into his or her workspace (IDE). Transfer of the relative bookmark may be accomplished in a wide variety of ways, for example as part of the source code to the configuration manager or through some other file transfer mechanism.

Figure 3:
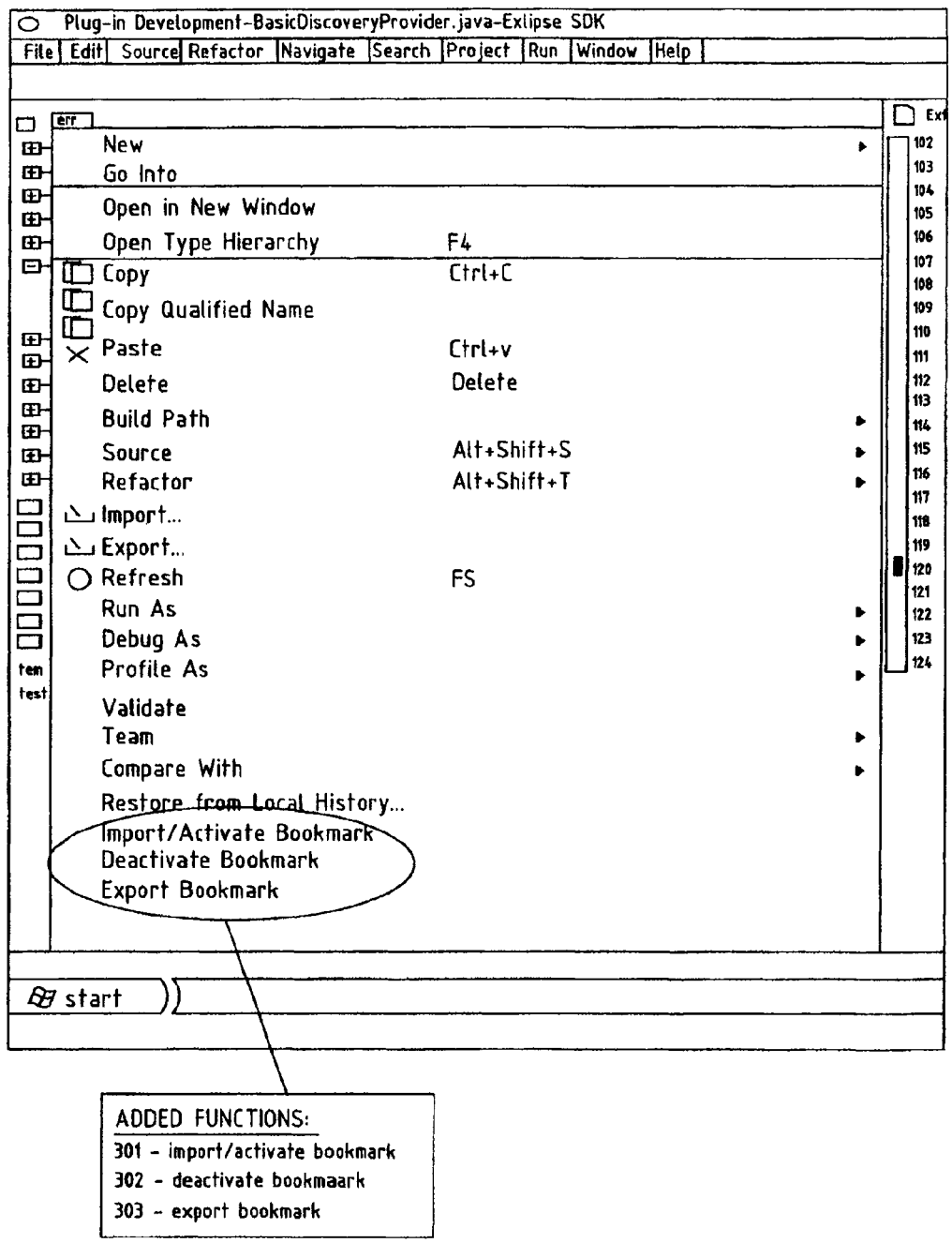
FIG. 3 illustrates a relative bookmarking menu according to one embodiment of the invention.

As shown in FIG. 3, an embodiment of the invention provides sharable, relative bookmarks that can be imported and exported as features in IDE. The functionality of the IDE is modified and configured to support relative bookmarks saving and sharing (i.e. importable and exportable) in many formats (e.g. XML files). FIG. 3 illustrates a graphical user interface in which the import/activate bookmark 301, the deactivate bookmark 302, and the export bookmark 303 functions are provided via drop down menu selections. After creating a relative bookmark, a developer can select the export bookmark 303 menu selection to export the relative bookmark to the code repository. Subsequently, another (e.g. support engineer) can, at his or her workspace, choose the import/activate 301 menu selection to import this relative bookmark from the network connected repository. The relative bookmark can be deactivated by selecting the deactivate bookmark 302 menu selection. As can be appreciated, this facilitates knowledge transfer between different users (and using different machines) in the context of the IDE rather than an unrelated file transfer (e.g. PowerPoint®).

Figure 4:
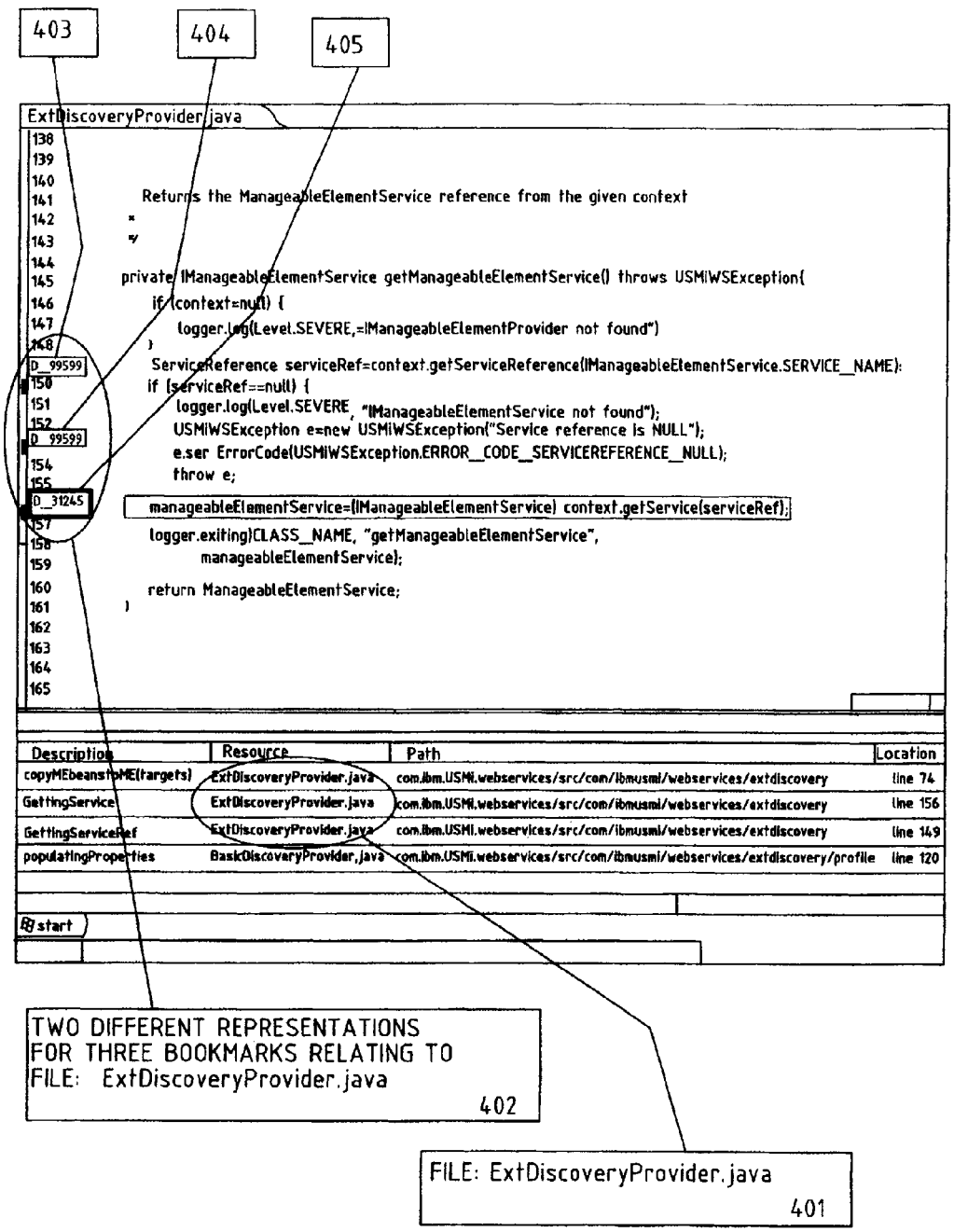
FIG. 4 illustrates a relative bookmark presentation according to one embodiment of the invention.

As shown in FIG. 4, different relative bookmarks 403, 404, 405 can be represented using different representations 402, for example colors, highlighting and/or icons. The relative bookmarks 403 and 404 for file 401 may have originated from a first developer. These relative bookmarks 403 and 404 can be imported (e.g. by an L3 support engineer) as an XML file into the IDE, as above. The third bookmark 405 indicated for the file 401 may have been created by a second developer, as represented by the different representation.

Conventional IDEs do not support import and export of relative bookmarks as contemplated herein. Moreover, currently a developer can place only one bookmark for a source code line. This can become problematic, for example by assuming a support engineer wants to import bookmarks for four features parallel, there is a possibility that some function/source code line can be part of more than one feature. Hence, that source code line needs to highlight the different feature bookmarks for a file 401 in a different form of representation 402 (e.g. a different color or icon), which is enabled according to an embodiment of this invention.

Moreover, the inventors have recognized that current bookmarks are not relative in that they lack important flow information, e.g. they do not define the function calling order sequence of the code flow. Thus the inventors have created relative bookmarks. Lack of flow information can prove problematic. For example, assuming a developer placed a bookmark function in order a, b, c; however, the function flow is actually b, a, c. If a subsequent person navigates using the above notation (e.g. via shortcut key "F2"), the IDE will navigate in as a, b, c. instead of the proper order b, a, c. Additionally, most of the current notations in source codes are absolute (source+line number). However, certain scenarios require relative bookmarking (source code, function name, block, source code line), as contemplated herein according to one embodiment of the invention, because the absolute location can change due to the changes that the source code undergoes during development/support phases of the software development life cycle.

According to one at least one embodiment of the invention, a relative bookmark saved (say) as an exportable/importable XML file structured with sequencing information is provided. The following is a discussion of a non-limiting example thereof. In the relative bookmark:

```
<Flow name="D_99599"> <!-- name is the defect number >
   <bookmark name="initializing ps_datastructure"> <!-- the name of
bookmark implies what that source line does. This name can be intuitively
taken from the comment above the source code line >
      <source filename = "PresentationBuffer.c">
      <function name = "psInit( )"> <!-- function name should be with
signature -- >
      <block name = "if (psmodified)"> <!-- should be uniquely identified>
      <source codeline = "ps = malloc(sizeof(struct ps))">
      <next bookmarkname = "modify ps_datastructure"><!- identifies the
next bookmark in sequence-->
   </bookmark>
   <bookmark name = "modify ps_datastructure">
   ....
   </bookmark>
</flow>.
```

As can be appreciated, the bookmark names utilized (e.g. initialise and modify) indicate flow information. Rather than relying on code line names (which can change throughout the software product's evolution), the bookmark is relative in that it carries flow information that remains useful even if the particular line of code has changed locations.

Some key benefits of the relative bookmarking solution proposed herein are that the relative bookmark(s) can point to a chosen subset of LOC that the developer considered important (and therefore created relative bookmarks for) and the relative bookmarks will carry the flow information indicating, e.g. the sequence of functions executed. Thus, the support engineer will not have to search through all lines of code in order to determine the overall flow of the given program and what may have cause a reported defect. Rather, the support engineer can simply import the relative bookmarks and refer to them, utilizing the flow information to quickly pinpoint the likely cause. Thus, a "change history" can be utilized to highlight all the source code changes that may be relevant to a defect. These relative bookmarks are thus linked to the code and presented in the context of the IDE, removing the need for the support engineer to decipher a separate file presentation (e.g. PowerPoint® presentation).

As a non-limiting example, assuming there are 200 (two hundred) LOC changed in a source code file, and out of this 200 (two hundred) LOC, most of them may be assignment or declaration and consequently may not be deemed important. Of the 200 (two hundred) LOC, assume (for this example) only 10 (ten) lines are doing some computation (where bugs can come in). According to one embodiment of the invention, the developer may create relative bookmarks for only these ten lines, facilitating troubleshooting by a subsequent support engineer. Thus the subsequent support engineer only needs to consider these 10 (ten) lines to be familiarized with the overall program flow. An embodiment of the invention provides the ability for one working in the IDE to navigate the source code as per the function/data flow defined in the relative bookmark file, for example by choosing to navigate the function or the data flow using a control key.

According to one embodiment of the invention, quick break points are enabled (e.g. via right clicking) through the relative bookmark(s), which can be useful, among other reasons, for training and troubleshooting. Generally, bookmarks are different from breakpoints in as much as break points are runtime, debugging specific; whereas the bookmarks are used/implemented during the design phase and development/support phases of product construction. Typical bookmarks contain only static information (e.g. for browsing code). For example, if the source code line is changed/removed, e.g. in the support development phase, it is a normal practice to comment on the line for deletion and tag it appropriately. For example //@A2D where "D" at the end denotes delete. Hence, removal can be safely assumed based upon the commenting. Breakpoints, however, are useful for dynamic analysis (e.g. stopping the execution of the program code when running the program in the IDE). According to an embodiment of the invention, the IDE is configured to insert/enable breakpoints at the relative bookmarked lines. Thus, an embodiment of the invention configures the relative bookmarks as breakpoints, allowing one to stop the execution of the program at the given relative bookmark point.

As noted above, current bookmarks lack the necessary flow information. Thus, an embodiment of the invention provides relative bookmarks containing necessary flow information. The relative bookmarks define function flow (e.g. sequence of execution). The relative bookmarking (file name+function name+block+source code line) of source code (the bookmarks intuitively use the source code line to identify the line and not the line number) is utilized, thus supporting intelligent string matching algorithms to map the source code line specified in the bookmark to the corresponding line in the source file+function name+block. More than one relative bookmark can be utilized per source code line and differentiated with different representations (e.g. as made by different developers). Moreover, the relative bookmarks are enabled as quick break points and a change history for the relative bookmarks is provided.

Figure 5:
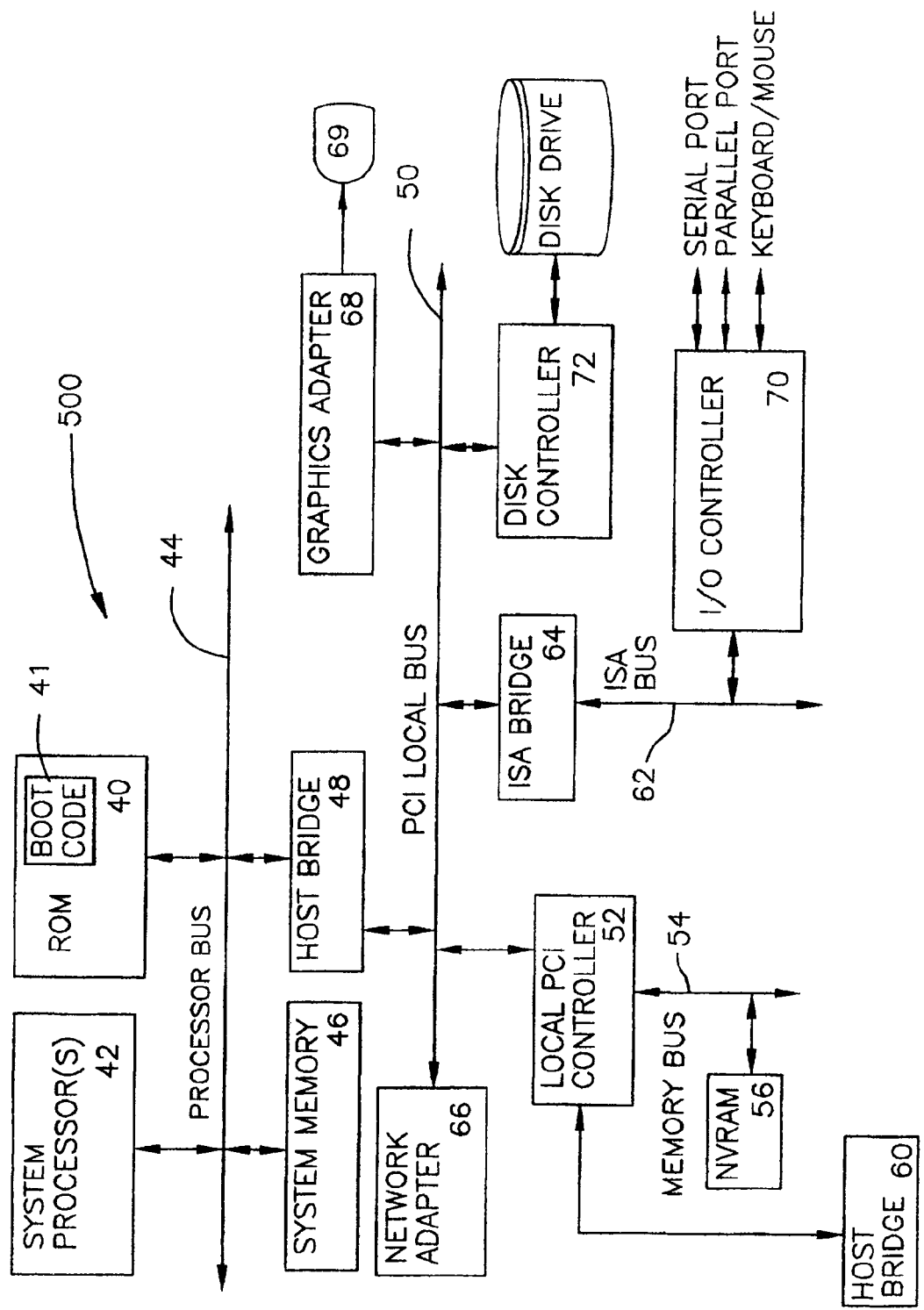
FIG. 5 illustrates a computer system according to one embodiment of the invention.

It should be understood that the modified IDE according to one embodiment of the invention could be implemented on a computer system or data processing system that is appropriately configured. Referring now to FIG. 5, there is depicted a block diagram of an illustrative embodiment of a computer system 500. The illustrative embodiment depicted in FIG. 5 may be a notebook computer system or a workstation computer. As is apparent from the description, however, the present invention is applicable any data processing system or other electronic device, as described herein.

As shown in FIG. 5, the computer system 500 includes at least one system processor 42, which is coupled to a Read-Only Memory (ROM) 40 and a system memory 46 by a processor bus 44. System processor 42, which may comprise one of the processors produced by Intel Corporation or ARM Ltd., is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces electronic device 100 to LAN 10, and graphics adapter 68, which interfaces electronic device 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

The computer system 500 further includes Industry Standard Architecture (ISA) bus 62, which is coupled to PCI local bus 50 by ISA bridge 64. Coupled to ISA bus 62 is an input/output (I/O) controller 70, which controls communication between electronic device 100 and attached peripheral devices such as a keypad, touch pad, and a disk drive. In addition, I/O controller 70 supports external communication by electronic device 100 via serial and parallel ports. The USB Bus and USB Controller (not shown) are part of the Local PCI controller (52).

In brief recapitulation, sharable, relative bookmarks are provided by embodiments of the instant invention. These sharable, relative bookmarks can be transmitted in a convenient format (e.g. XML) and stored in a repository. Thus, subsequent use of the relative bookmarks, e.g. by others such as support engineers, is facilitated. The relative bookmarks contain valuable information regarding the function and data flow for the given product, thus facilitating the understanding of an individual interested in the changes made during the evolution of the product. Moreover, the nature of the relative bookmark ensures they remain relevant even if a bookmarked line of code is changed during product evolution.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

The invention claimed is:

1. A method comprising:
utilizing one or more processors of a machine to execute computer readable program code configured to provide one or more relative bookmarks for one or more lines of changeable source code, wherein an absolute location of the one or more lines of source code is changeable relative to change in the source code; and
utilizing the one or more processors of the machine to execute computer readable program code configured to:
export the one or more relative bookmarks from a first system to one or more code repositories, each of the one or more relative bookmarks comprising a file;
store the one or more relative bookmarks in the one or more code repositories; and
avail the one or more relative bookmarks for extraction from the one or more code repositories for importation and subsequent use in a second system different from the first system.

2. The method according to claim 1, further comprising:
utilizing the one or more processors of the machine to execute computer readable program code configured to import one or more relative bookmarks.

3. The method according to claim 1, wherein the one or more relative bookmarks comprise one or more of function and data flow information.

4. The method according to claim 3, wherein the one or more of function and data flow information comprises one or more bookmark names indicating a sequence of functions.

5. The method according to claim 1, wherein the one or more relative bookmarks comprises an XML file having relative bookmark information contained therein.

6. The method according to claim 2, further comprising:
utilizing the one or more processors of the machine to execute computer readable program code configured to activate one or more imported relative bookmarks.

7. The method according to claim 6, further comprising:
utilizing the one or more processors of the machine to execute computer readable program code configured to deactivate one or more imported relative bookmarks.

8. The method according to claim 1, further comprising:
utilizing the one or more processors of the machine to execute computer readable program code configured to insert a breakpoint at the one or more relative bookmarks.

9. The method according to claim 1, further comprising:
utilizing the one or more processors of the machine to execute computer readable program code configured to graphically represent the one or more relative bookmarks with a developer specific graphical representation, the developer specific graphical representation comprising one or more of a color and an icon.

10. The method according to claim 1, wherein the one or more lines of source code comprises evolving source code.

11. The method according to claim 10, wherein the one or more relative bookmarks identify the one or more lines of source code relative to one or more other lines of source code in the evolving source code.

12. The method according to claim 1, wherein the one or more relative bookmarks identify the one or more lines of source code relative to one or more other lines of source code.

13. The method according to claim 12, comprising utilizing the one or more processors of the machine to execute computer readable program code configured to import one or more relative bookmarks.

14. The method according to claim 13, comprising utilizing the one or more processors of the machine to execute computer readable program code configured to import one or more relative bookmarks from the one or more code repositories.

* * * * *